United States Patent [19]
Blackburn et al.

[11] Patent Number: 5,683,103
[45] Date of Patent: Nov. 4, 1997

[54] METHOD AND APPARATUS FOR SENSING A REARWARD FACING CHILD SEAT

[75] Inventors: Brian K. Blackburn, Rochester; Joseph F. Mazur, Washington; Gregory S. Bayley, Livonia; Scott B. Gentry, Romeo, all of Mich.

[73] Assignee: TRW Vehicle Safety Systems Inc., Lyndhurst, Ohio

[21] Appl. No.: 734,485

[22] Filed: Oct. 21, 1996

Related U.S. Application Data

[63] Continuation of Ser. No. 147,682, Nov. 3, 1993, Pat. No. 5,605,348.

[51] Int. Cl.$^6$ ................................................. B60R 21/32
[52] U.S. Cl. ........................... 280/735; 180/273; 340/438
[58] Field of Search ........................ 280/735; 180/271, 180/273; 340/425.5, 438, 457.1, 457, 666, 667, 903; 307/9.1, 10.1; 364/424.05

[56] References Cited

U.S. PATENT DOCUMENTS

| | | | |
|---|---|---|---|
| 3,992,028 | 11/1976 | Abe et al. | 280/728.1 |
| 5,260,684 | 11/1993 | Metzmaker | 340/457.1 |
| 5,454,591 | 10/1995 | Mazur et al. | 280/735 |
| 5,468,014 | 11/1995 | Gimbel et al. | 280/735 |
| 5,474,327 | 12/1995 | Schousek | 280/735 |
| 5,515,933 | 5/1996 | Meyer et al. | 180/273 |
| 5,528,698 | 6/1996 | Kamei et al. | 280/735 X |
| 5,570,903 | 11/1996 | Meister et al. | 280/735 |
| 5,605,348 | 2/1997 | Blackburn et al. | 280/735 |

*Primary Examiner*—Christopher P. Ellis
*Attorney, Agent, or Firm*—Tarolli, Sundheim, Covell, Tummino & Szabo

[57] ABSTRACT

An apparatus (20) for preventing actuation of an air bag restraining device (90) of a vehicle includes a sensor (24, 26) that senses the presence of a child restraining seat (40) on an occupant seat (30) of the vehicle. A controller (22) is operatively connected to the sensor (24, 26) and to the air bag restraining device (90) for controlling actuation of the air bag and preventing actuation of the air bag when the sensor (24, 26) senses the child restraining seat (40) on the occupant seat (30).

2 Claims, 3 Drawing Sheets

METHOD AND APPARATUS FOR SENSING A REARWARD FACING CHILD SEAT

This is a continuation of application Ser. No. 08/147,682 filed on Nov. 3, 1995, now U.S. Pat. No. 5,605,348.

TECHNICAL FIELD

The present invention is directed to a vehicle occupant restraint system and is specifically directed to an apparatus for preventing deployment of an air bag restraint when a child safety seat is secured to an associated seat and is positioned in a rearward facing direction.

BACKGROUND OF THE INVENTION

Air bag restraint systems for vehicles are well known in the art. It is also known to prevent deployment of an air bag during a vehicle crash when the air bag is associated with a seat location that is unoccupied. Deployment of an air bag associated with an unoccupied seat location (typically the passenger seat location) during a vehicle crash adds unnecessary expense to repair of the vehicle.

To prevent such unnecessary deployment of an air bag at an unoccupied seat location, sensors are provided to detect the presence of an occupant on a vehicle seat. These sensors include pressure sensing switches located in the seat cushion or infrared sensors located in the vehicle dashboard or instrument panel. If no occupant is detected as being present on a seat, deployment of an associated air bag during a crash condition is prevented through an appropriate control arrangement.

It is also desirable to prevent actuation of an air bag restraint system when a child restraining seat is secured and positioned in a rearward facing direction on a vehicle seat at an associated seat location. When a rearward facing child seat is secured to the vehicle seat, deployment of an air bag during a vehicle crash condition would not provide the child with additional protection since the child's head and torso would not move relative to the child seat in the direction of vehicle travel.

SUMMARY OF THE INVENTION

The present invention provides a method and apparatus for sensing presence of a rearward facing child seat and prevents deployment of an associated air bag during a vehicle crash condition if the rearward facing child seat is sensed as being present.

In accordance with one embodiment of the invention, an apparatus is provided for preventing actuation of an actuatable occupant restraining device of a vehicle. The apparatus includes sensing means for sensing the presence of a child restraining seat on an occupant seat of the vehicle. Control means is operatively connected to the sensing means and to the actuatable occupant restraining device for preventing actuation of the actuatable occupant restraining device when the sensing means senses the child restraining seat on the occupant seat.

In accordance with another embodiment of the present invention, a method is provided for preventing actuation of an actuatable occupant restraining device of a vehicle. The method comprises the steps of sensing the presence of a child restraining seat on an occupant seat of the vehicle and preventing actuation of the actuatable occupant restraining device when the child restraining seat is sensed as being present on the occupant seat.

In accordance a preferred embodiment of the present invention, an apparatus is provided for preventing actuation of an air bag restraint when a rearward facing child restraining seat is present on an associated occupant seat location. The apparatus comprises identifiable tag means secured to the child restraining seat at a predetermined location for permitting identification of the child restraining seat and for permitting a determination of whether the child restraining seat is rearward facing. The identifiable tag means is preferably made from an amorphous material that changes magnetic permeability when subjected to an EMF energy signal. Changes in the magnetic permeability of the tag effects generation of a return EMF signal from the tag. A sensing means is provided for detecting the presence of the identifiable tag means within the associated occupant seat location and for providing an electrical signal indicative of (i) the presence of the identifiable tag means within the associated occupant seat location, and (ii) the child restraining seat being in a rearward facing direction.

The sensing means of the preferred embodiment includes an antenna coil for transmitting an EMF energy signal to subject the tag to the EMF energy signal so that the tag produces an EMF return signal. The antenna coil receives the returning EMF signal from the tag and transforms the return EMF signal into a received electric signal. The sensing means further includes a bandpass filter means operatively connected to the antenna coil for passing the received electric signal having a predetermined frequency. Converter means is operatively connected to the bandpass filter means for converting the passed electric signal to a digital HIGH when the return EMF signal from the tag is present and the child restraining seat is in a rearward facing direction and a digital LOW when the return EMF signal from the tag is not present. Means are provided for preventing deployment of the air bag when the signal from the converter means indicates (i) the presence of the identifiable tag means within the associated occupant seat location, and (ii) the child restraining seat is in a rearward facing direction. Indicator means is operatively connected to the means for preventing deployment and is actuated when the air bag restraint is prevented from being actuated.

BRIEF DESCRIPTION OF THE DRAWINGS

The foregoing and other features of the present invention will become apparent to one skilled in the art to which the present invention relates upon consideration of the following detailed description of the invention with reference to the accompanying drawings, in which.

DESCRIPTION OF PREFERRED EMBODIMENT

Figure 1:
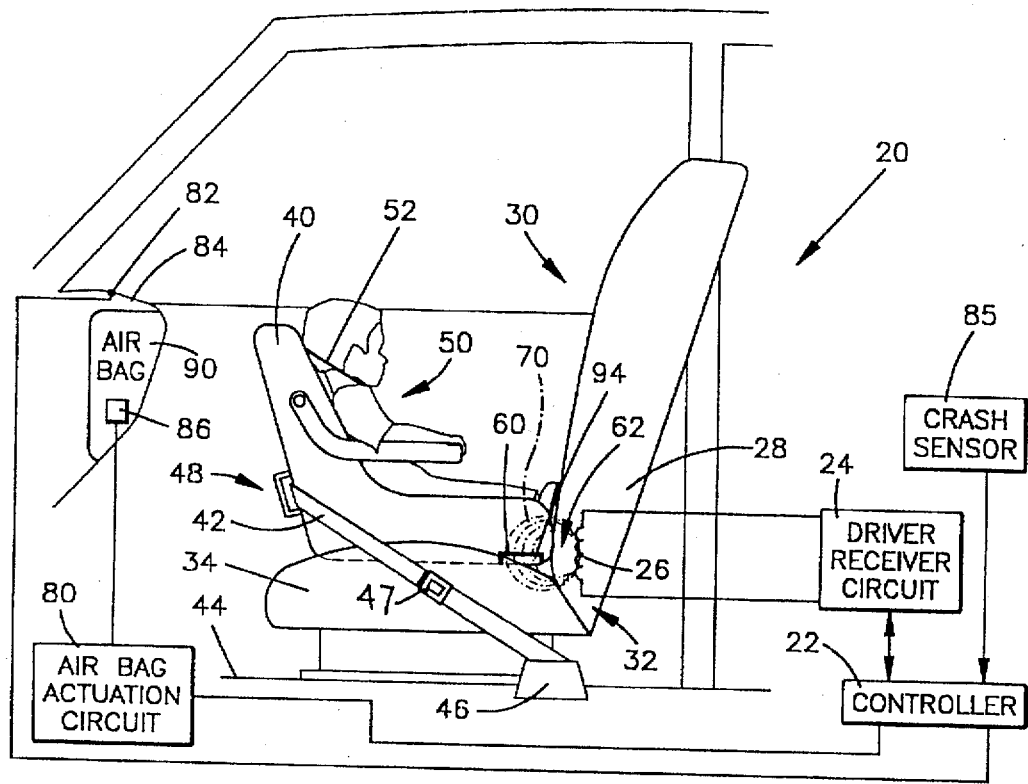
FIG. 1 is a schematic of an air bag restraint system made in accordance with the present invention.

Referring to FIG. 1, an apparatus 20, in accordance with the present invention, includes a controller 22 operatively connected to a driver/receiver circuit 24. Driver/receiver circuit 24 is operatively connected to an antenna coil 26. The driver/receiver circuit 24 energizes the antenna coil 26 with, in accordance with one embodiment of the present invention, periodic pulses and then monitors for a returning electromagnetic field ("EMF") signal.

The antenna coil 26 is preferably located in the back portion 28 of a vehicle seat 30 near the bottom 32 where the seat back 28 meets the seat cushion 34. For purposes of explanation, the seat 30 is the front passenger seat. It will be appreciated by those skilled in the art that the seat 30 can be any of the occupant seats of the vehicle.

A child restraining seat 40 is secured to the seat 30 in a rearward facing direction by use of the lap belt 42 secured to the vehicle floor 44 through a mounting assembly 46 and buckle 47 well known in the art. The lap belt 42 is received in a belt holder 48 of the child restraining seat 48 and is secured to the vehicle floor on the other side (not shown) through a retractor assembly (not shown), also well known in the art. A child 50 is secured in the child restraining seat 40 using a three-point, over-both-shoulders harness restraint 52 that is typical for child restraining seats.

A child restraining seat identification tag 60 is secured to the child restraining seat 40 near the front location 62 of the seat 40 by an appropriate holding means such as glue or by being molded into a plastic part of such a car seat during its manufacture. When the child restraining seat 40 is secured in a rearward facing direction on occupant seat 30, the front 62 of the child restraining seat 40 is adjacent the back portion 28 of the seat 30. The distance between the antenna coil 26 and the identification tag 60 is thus only a few inches and well within the effects of an EMF field 70 transmitted by the antenna coil 26.

The controller 22 is controllably connected to an air bag actuation circuit 80 and to a warning light 82 visibly mounted to the vehicle dashboard or instrument panel 84. A vehicle crash sensor 85 is operatively mounted to the vehicle and is electrically connected to the controller 22. The crash sensor 85 can be any of several known crash sensors, including an inertia switch or an accelerometer, that provide an electric signal to the controller indicative of the vehicle's deceleration.

The air bag actuation circuit 80 is electrically connected to a squib 86. The squib 86 is operatively connected to an inflatable occupant restraint or air bag assembly 90 mounted in the dashboard 84 in a manner well known in the art. The squib is operatively coupled to a source of inflation fluid, such as an ignitable gas generating material and/or a container of pressurized gas (not shown). The controller 22 monitors the crash sensor 85 for the occurrence of a vehicle crash condition. Upon the occurrence of a vehicle crash condition (assuming no rearward facing child seat is detected as described below), the controller 22, through the air bag actuation circuit 80, energizes the squib 86. The squib 86, when energized, causes the source of inflation fluid to release inflation fluid to inflate an air bag in the air bag assembly 90. The air bag is then momentarily inflated to its operative restraining position in a manner well known in the art.

The identification tag 60 is made from a highly permeable amorphous material that is reactive when subjected to an EMF signal. Preferably, the identification tag 60 also includes a permanent magnet portion 94 that functions to bias the amorphous material at the "knee" of the BH curve of the amorphous material.

As is known by those skilled in the art, the BH curve of the amorphous material is a plot of the magnetic flux density B as a function of the magnetic field intensity H. The "knee" of the BH curve is the region of the curve where the amorphous material exhibits a nonlinear permeability. As a result of its bias at the nonlinear "knee" of its BH curve, the amorphous material of identification tag 60 oscillates when the material is placed in an electromagnetic field having a minimum field strength, such as the EMF signal 70 transmitted by the antenna coil 26. Since the strength of the EMF signal decreases as a function of one over the distance squared ("the inverse square law"), the distance between the antenna coil 26 and the tag 60 is critical. The distance must be less than a predetermined distance to ensure the EMF signal 70 is strong enough to effect oscillation of the tag material.

Figure 2:
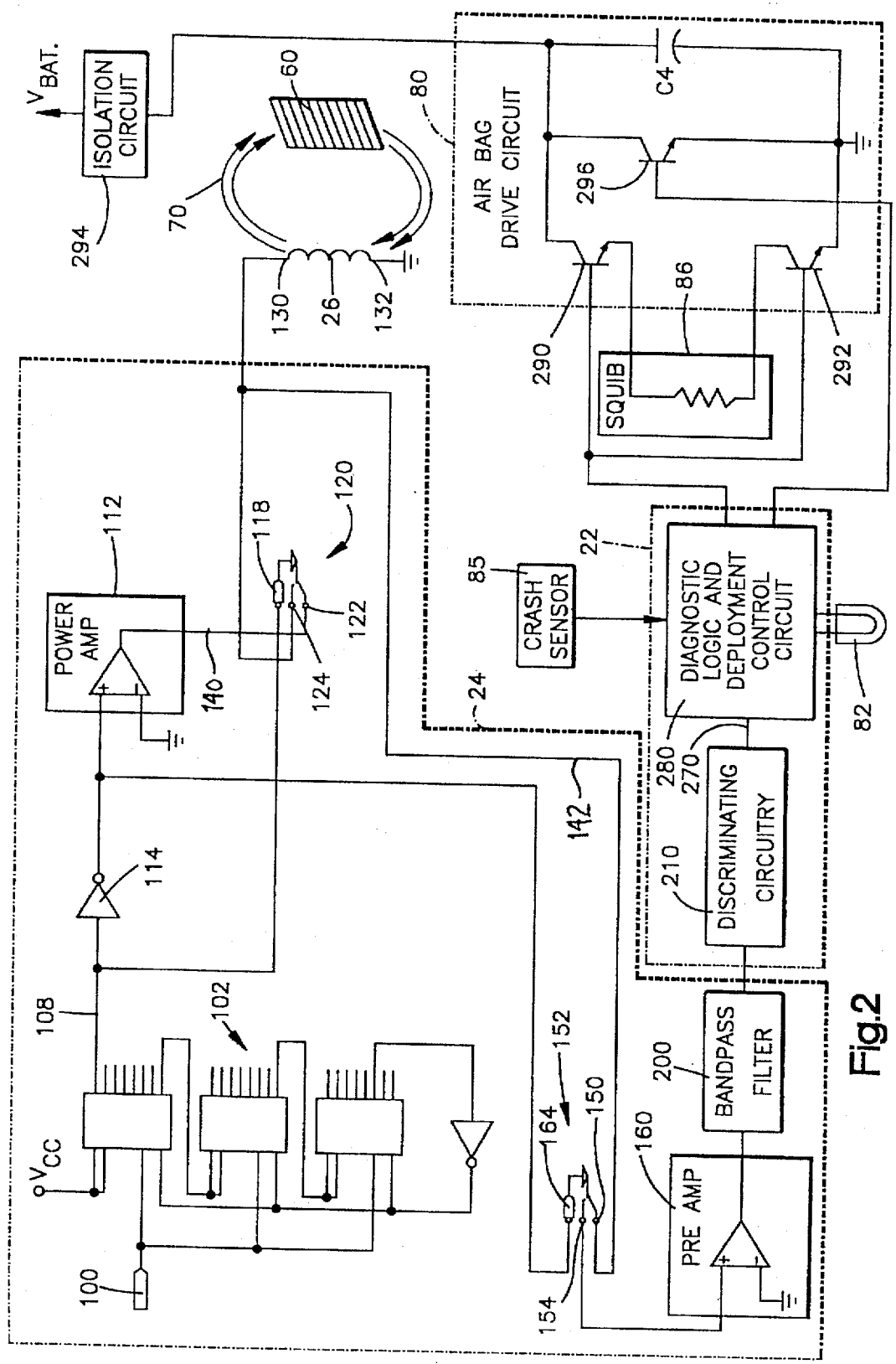
FIG. 2 is a schematic of a portion of the circuitry shown in FIG. 1.
Figure 3:
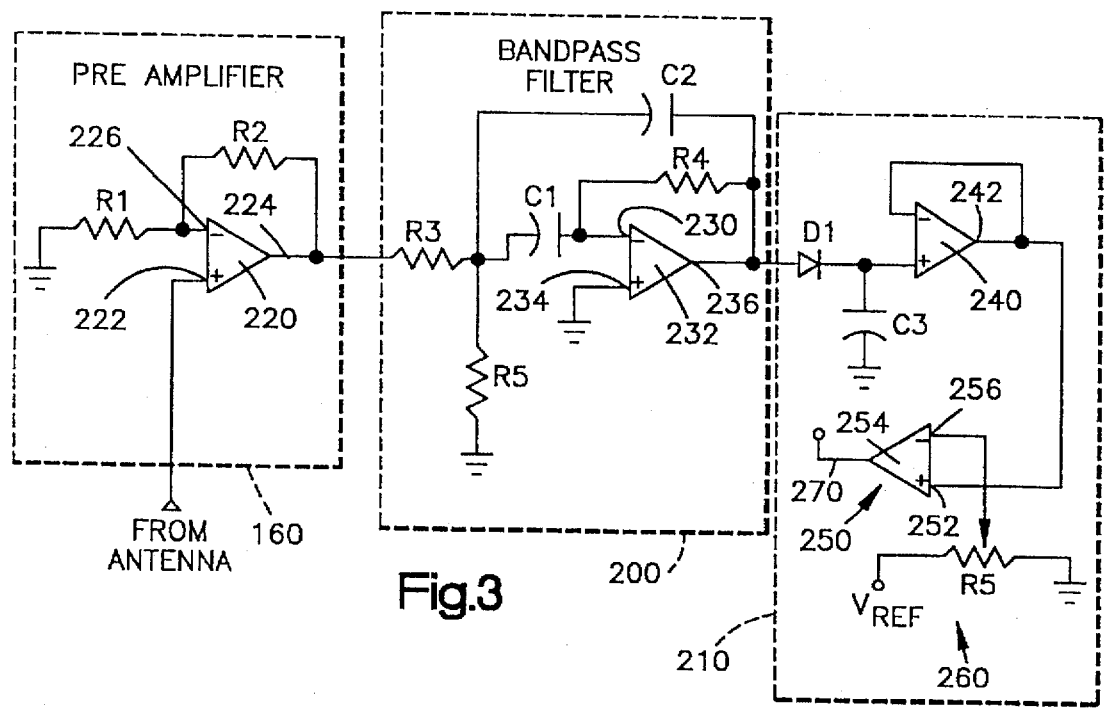
FIG. 3 is a schematic of a portion of the circuitry shown in FIG. 2 shown in more detail.
Figure 4:
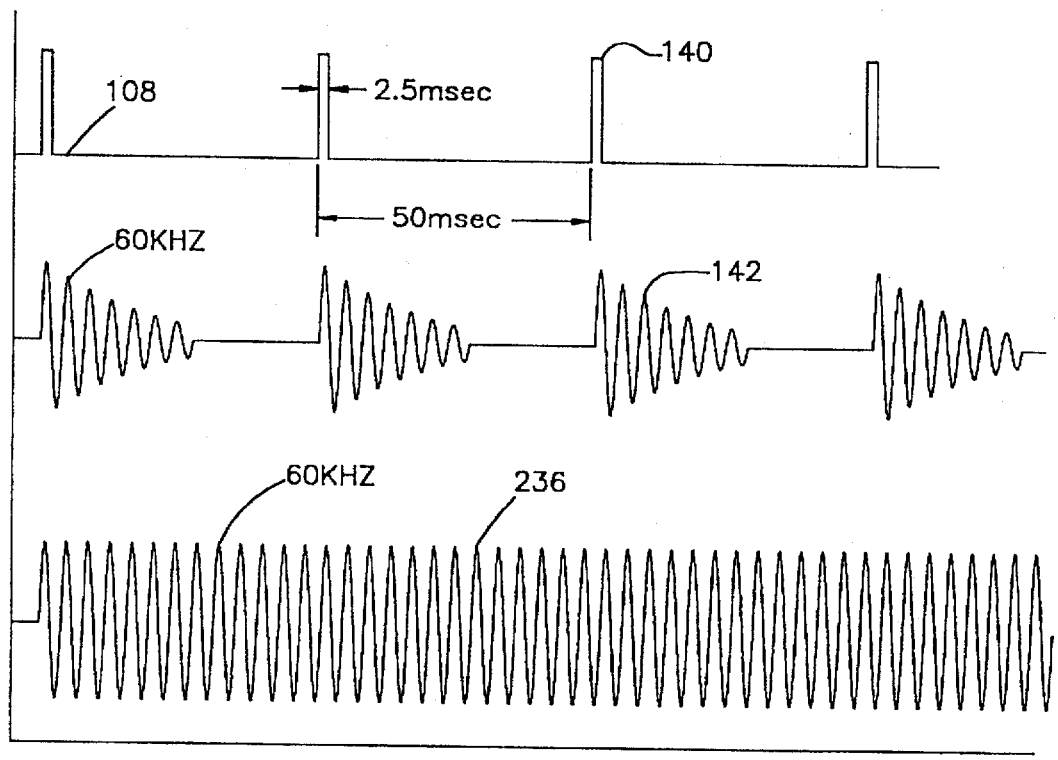
FIG. 4 is a graphical representation of signals of the air bag restraint system shown in FIG. 1.

Referring to FIGS. 2–4, the operation of the controller 22, driver/receiver circuit 24, and air bag actuation circuit 80 will be better appreciated. In the driver/receiver circuit 24, a 400 Hz clock pulse generator 100 is operatively connected to a clock pulse input of a plurality of shift registers 102. An output 108 of the shift registers 102 provides a 5% duty cycle of a 50 msec period pulse, i.e., the output of the shift registers 102 is a 2.5 msec. HIGH pulse. The output of the shift registers 102 is connected to a power amplifier 112 through an inverter 114. The output of the shift registers 102 is also operatively connected to a control input 118 of a relay switch 120.

The output of the power amplifier 112 is connected to a first terminal 122 of the relay switch 120. The second terminal 124 of the switch 120 is connected to a first terminal 130 of the antenna coil 26. A second terminal 132 of the antenna coil 26 is connected to electrical ground. When the output pulse from the shift registers 102 is a HIGH, the relay switch 120 is closed so that the output of the power amplifier energizes the antenna coil 26. When the antennal coil 26 is energized, it produces an EMF signal. It should be appreciated that the antenna coil 26 is energized every 50 msec for a duration of 2.5 msec. When the output of the shift registers is LOW, the driver/receiver circuit 24 is in a receive mode to sense if a magnetic tag 60 is present.

When the identification tag 60 is present in the EMF field produced by the energized antenna coil 26, i.e., within a predetermined distance of the antenna coil 26, the tag's amorphous material is stressed by the EMF signal, thereby creating a change in the magnetic permeability of the material. This change in the magnetic permeability, which results from magneto-striction, results in passive EMF waves radiating from the tag at the tag's mechanical natural frequency. The frequency at which the passive EMF waves radiate is a function of the shape of the tag and thickness of the tag.

In accordance with one embodiment of the present invention, the tag radiates a passive return EMF signal at 60 kHz (kilo-Hertz). This 60 KHz return EMF signal radiated from the tag has a power output that is functionally related to the power of the transmitted EMF energy from the antenna coil 26. The power of transmitted EMF energy is functional related to the distance from the antenna coil 26 in accordance with the well known inverse square law. Consequently, the power of the 60 KHz return EMF signal radiated by the amorphous material of the identification tag 60 also varies as a function of the distance between the identification tag 60 and the antenna coil 26. The greater the distance between the identification tag 60 and the antenna coil 26, the lower will be the power output from the tag.

The 60 KHz return EMF signal radiated by the amorphous material of identification tag 60 is received by antenna coil 26. The antenna coil 26 transforms the return EMF signal into a received electric signal. The first terminal 130 of the antenna coil 26 is operatively connected to a first terminal 150 of a relay switch 152. The second terminal 154 of the relay switch 152 is connected to the input of an amplifier 160. The control input 164 of the relay switch 152 is connected to the output of the inverter 114.

Both switches 120 and 152 are normally open switches. By having the control input 118 for the relay switch 120 connected to one side of the inverter 114 and the control input 164 for the relay switch 152 connected to the other side of the inverter 114, the antenna coil 26 is either connected to the output of the amplifier 112 or to the input of the amplifier 160. When the output 108 of the shift registers 102 is HIGH, the control input 118 of switch 120 is energized thereby connecting the output of amplifier 112 to the antenna coil 26. This condition is the transmit mode. When the output 108 is LOW, the output of inverter 114 is HIGH which energizes the control input 164 of switch 152. When the control input 164 is energized, the antenna coil 26 is connected to the input of amplifier 160. This condition is the receive mode.

The output of the amplifier 160 is connected to a bandpass filter 200 designed to pass an electrical signal having a frequency centered on a predetermined frequency such as 60 kHz. Preferably, the 3 db down values of the filter are 59.900 kHz and 60.100 kHz. The output of the bandpass filter 200 is connected to a discriminating circuit 210 which is part of the controller 22. The discriminating circuit 210 monitors for the presence of a return EMF signal by monitoring for a received electric signal transformed by the antenna coil 26 having a frequency equal to 60 kHz and a predetermined minimum amplitude. If such a return EMF signal is present (as determined by the presence of a received electric signal), this indicates that an identification tag is present and within a predetermined distance of the antenna coil 26.

Referring to FIG. 3, the amplifier 160 includes an operational amplifier 220 connected as a non-inverting amplifier. The return signal from the antenna coil through the relay switch 152 is connected to the non-inverting input 222 of the amplifier 220. A resistor R2 is connected between the output 224 of amplifier 220 and the inverting input 226 of the amplifier 220. A resistor R1 is connected between the inverting input 226 and electrical ground. As those skilled in the art will appreciate, the gain of the amplifier 160 is equal to (1+R2/R1).

The output 224 of the amplifier 160 is connected to one terminal of a resistor R3 of the bandpass filter 200. The second terminal of the resistor R3 is connected to the inverting input 230 of an operational amplifier 232 through a capacitor C1 and to electrical ground through a resistor R5. The non-inverting input 234 of amplifier 232 is connected to electrical ground. The output 236 of amplifier 232 is connected to the inverting input 230 through a resistor R4 and to the second terminal of the resistor R3 through a capacitor C2. The bandpass frequency for the circuit shown in FIG. 3 is defined as $$\omega = \frac{1}{\sqrt{R3 \times R4 \times C1 \times C2}}$$

The Q (inverse measure of the bandwidth) of the circuit is defined as $$Q = R3 \times C1 \times G \times \omega$$

The gain G of the circuit is defined as $$G = Q \times \sqrt{\frac{R4}{R3}}$$

Referring to the graphs of FIG. 4, the operation of the bandpass filter will be better appreciated. It is assumed that the identification tag 60 is within a predetermined interactive distance of the antennal coil 26, i.e., the strength of the transmitted field from the antenna coil 26 is sufficient to cause the tag 60 to oscillate and generate a return signal. Each time the antenna coil is energized by the output 140 of amplifier 112, the tag produces a ring back of EMF energy at 60 kHz. The return EMF signal is transformed by the antenna coil 26 into a received electric signal 142 (the frequency curves are not drawn to scale). The amplitude of the ring back decays to a zero value prior to the generation of the next energizing pulse applied to the antenna coil 26. This occurrence of the decaying amplitude is referred to as the ring down of the return signal. The values of the components that make up the bandpass filter are selected so that the circuit 200 has a sufficiently high Q value to enable the output 236 of the bandpass filter to continue to ring for a predetermined time after the ring down of the signal from the tag occurs and also to specifically pass the tag's natural frequency. If the tag 60 is removed from the effects of the transmitted EMF signal, i.e., the tag 60 is more than a predetermined distance from the antenna coil 26, the output 236 of the bandpass filter 200 will eventually decay to a zero value.

The output 236 from the bandpass filter 200 is connected to an anode of a diode D1 of the discriminating circuit 210. The cathode of the diode D1 is connected to one terminal of a capacitor C3. The second terminal of the capacitor C3 is connected to electrical ground. The diode D1 and the capacitor C3 function as a filter to convert the signal passed by the bandpass filter 200 into a DC signal having a voltage value functionally related to the distance between the antenna coil 26 and the tag 60. The junction of diode D1 and capacitor C3 is connected to a non-inverting input of an operational amplifier 240 connected as a voltage follower with the output 242 connected to its inverting input.

The output 242 of the voltage follower is also connected to a comparator circuit 250 and specifically to the non-inverting input 252 of comparator 254. The inverting input 256 of comparator 254 is connected to a DC voltage reference source 260 through an adjustable potentiometer R5. R5 is adjusted to a value that controls the discrimination distance at which the output 270 switches. When the tag 60 is present within a predetermined distance of the antenna coil 26, the output 270 of the discriminating circuit is a HIGH. When the tag 60 is not present or is not within a predetermined distance of the antenna coil 26, the output 270 is a LOW.

Referring back to FIG. 1, the tag 60 is preferably located at bottom front of the child seat 40. The antenna coil 26 is preferably located in the seat back 28 near the bottom portion of the seat back so that when a child seat 40 is secured in a rearward facing direction, the distance between the tag 60 and the antenna coil 26 is a few inches. The circuit components, power levels, and value of R5 are selected so that if the child seat 40 is secured in a forward facing direction thereby positioning the tag 60 a distance of twelve or more inches from the antenna coil 26, no return EMF signal from the tag is produced and/or received by the antenna coil 26.

Referring back to FIG. 2, the output 270 of the discriminating circuit 210 is connected to a diagnostic logic and deployment control circuit portion 280 of the controller 22. The outputs of the deployment control circuit 280 are connected to the air bag drive circuit 80. It is contemplated that several different arrangements can be provided for permitting or preventing deployment of the air bag 90 in response to the signal from the discriminating circuit.

In accordance with one embodiment, the air bag drive circuit 80 includes two switching transistors 290, 292 connected in series with the squib 86 across a source of electrical energy, typically the vehicle battery, through an appropriate isolation circuit 294. A parallel connected back-up capacitor C4 provides a back-up source of electrical energy. When a crash condition is detected by sensor 85, and no rearward facing child seat is detected, the deployment control circuit enables transistors 290, 292 which results in energization of squib 86.

A disable transistor 296 is connected in parallel across the series connected switching transistors 290, 292 and squib 86. When the air bag drive circuit 80 is to be disabled so as to prevent deployment of the air bag when a rearward facing child seat is detected, the transistor 296 is turned ON thereby preventing electrical energy from passing through the squib 86. Those skilled in the art will appreciate, however, that this arrangement has the disadvantage of requiring electrical isolation between each deployment circuit (assuming the vehicle has a plurality of air bag restraints) and from the vehicle battery.

It is preferred that the deployment control circuit be a microcomputer that is programmed simply to not permit activation of the switching transistors 290, 292 when a HIGH is received from the discriminating circuit 210. The use of such an arrangement eliminates the need for transistor 296 and any isolation circuitry 294.

When deployment of the air bag 90 is prevented due to the detection of a rearward facing child restraining seat 40, the warning lamp 82 is energized to warn the vehicle occupants that the air bag 90 associated with that seat will not be deployed should a vehicle crash condition occur. This indicator 82 also serves as a diagnostic indicator. For example, if the light is illuminated and no rearward facing child restraining seat is on the occupant seat, the vehicle operator will know that the air bag restraint system needs repair. Other system diagnostics can also be incorporated into circuit 280 such as those disclosed in U.S. Pat. No. 4,825, 148.

Figure 5:
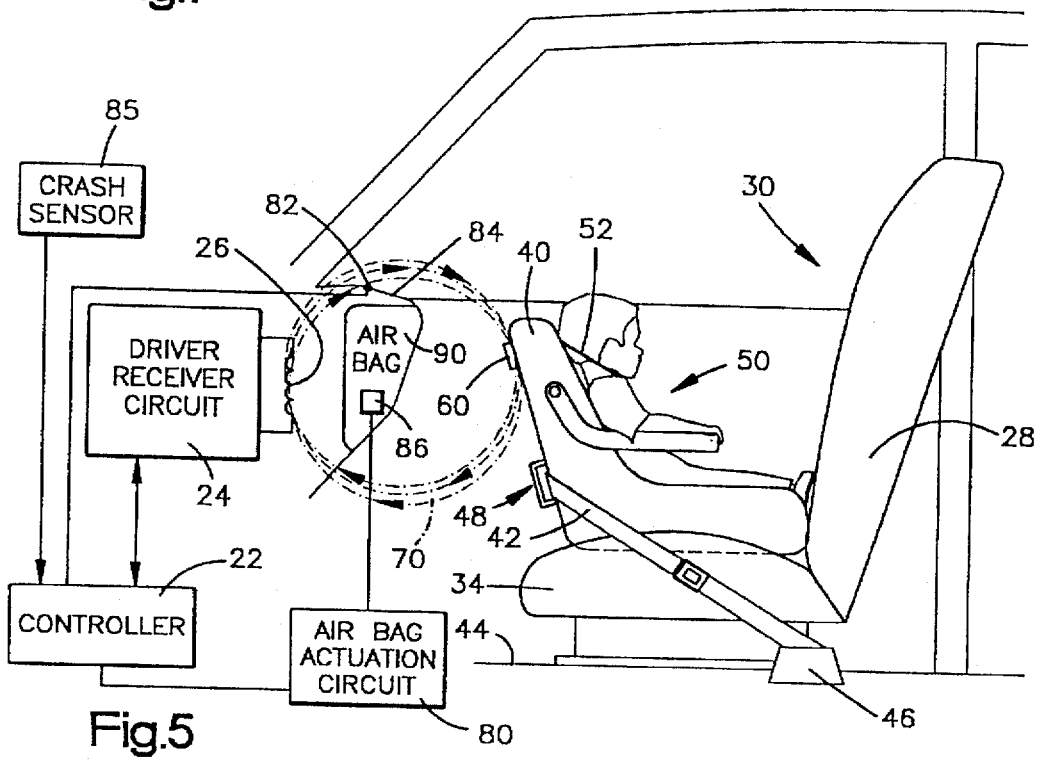
FIG. 5 is a schematic of another embodiment of an air bar restraint system made in accordance with the present invention.

FIG. 5 shows an alternative embodiment, in accordance with the present invention. The difference between the FIG. 5 embodiment and the FIG. 1 embodiment is the location of the antenna coil 26 and the tag 60. Otherwise, the remainder of the system is the same. In accordance with the FIG. 5 embodiment, the antenna coil 26 is located in the dashboard 84 and the tag 60 is secured to the top, back portion of the child restraining seat 40. The components of the driver/receiver circuit 24 and controller 22 are selected so as to account for the separation distance between the antenna coil 26 and the tag 60 when the rearward facing child seat 40 is properly positioned on the occupant seat 30. For example, assume that when the child restraining seat 40 is secured in a rearward facing direction, the tag 60 is within twelve inches of the antenna coil 26. With these conditions, the component values, power levels, and value of R5 are selected so that when the tag 60 is within fourteen inches (a value selected for tolerance consideration) of the antenna coil 26, a digital HIGH is produced by the discriminating circuit 210. If the child seat is secured in a forward facing direction, the tag 60 would be greater than fourteen inches from the antenna coil, and the discriminating circuit would output a digital LOW. As with the embodiment of FIG. 1, the warning lamp 82 is energized when deployment of the air bag is blocked or prevented because the discriminating circuit has detected a rearward facing child restraining seat.

It may be desirable to prevent deployment of an associated air bag whenever a child restraining seat is secured to an associated occupant seat location independent of whether the child restraining seat is facing forward or rearward. In this situation, the components of the power amplifier 112, the amplifier 160, and the discriminating circuit 210, as well as the position of the antenna coil 26 and the tag 60, are selected so that a child seat is detected when secured to the occupant seat independent of the facing direction of the child restraining seat. When the child seat is detected as being present, deployment of an associated air bag is prevented.

It may also be desirable to not disable deployment of the air bag upon detection of a rearward facing child seat but to simply provide a warning indication to the other vehicle occupants. A warning indication, such as an illuminating warning light, would inform the other vehicle occupants that the child restraining seat must be turned to be forward facing. Such an arrangement could also include a non-volatile memory for recording the occurrence of a detected rearward facing child seat, a provided warning signal, and operation of the vehicle.

From the above description of the invention, those skilled in the art will perceive improvements, changes and modifications. For example, a continuous pulsing scheme was described with the controller continuously looking for returning signals. Instead, a non-continuous pulsing scheme, such as an FSK scheme, i.e., frequency shift keying protocol, could be used. In such an arrangement, the controller would have a discriminating circuit looking for a particular returning pulse pattern. Also, a bar code label could be secured to the back of the child restraining seat with an optical scanner located in the dashboard. If the optical scanner "sees" the bar code label indicative of the child restraining seat, deployment of the air bag is prevented. Other types of sensors may also be used such as RF transponder tag, Hall effect sensors, polarized optical sensors, and light reflectors. Use of an RF transponder would include an RF transmitter in the seat or dashboard. The tag would include an integrated circuit, a coil and a capacitor. Serial communication would be established between the transmitter and the tag using FSK protocol. Such improvements, changes and modifications within the skill of the art are intended to be covered by the appended claims.

Having described the invention, the following is claimed:

1. An apparatus for warning of a rearward facing child restraining seat in a vehicle, said apparatus comprising:

sensing means for sensing the rearward facing child restraining seat in the vehicle; and warning means operatively coupled to said sensing means for providing a warning indication upon detection of said rearward facing child restraining seat.

2. A method for warning of a rearward facing child restraining seat in a vehicle, said method comprising the steps of:

sensing the rearward facing child restraining seat; and providing a warning indication when the rearward facing child restraining seat is sensed.

* * * * *